United States Patent [19]

Klinkel

[11] Patent Number: 4,553,377
[45] Date of Patent: Nov. 19, 1985

[54] PACKAGING MACHINE WITH SEALING MEANS

[75] Inventor: Wolfgang Klinkel, Sala Capriasca-Bigorio, Switzerland

[73] Assignee: Eurobreva Engineering Trust, Lugano, Switzerland

[21] Appl. No.: 615,082

[22] Filed: May 29, 1984

[30] Foreign Application Priority Data

May 31, 1983 [CH] Switzerland ............... 2969/83

[51] Int. Cl.$^4$ .................. B65B 9/12; B65B 51/30
[52] U.S. Cl. .................. 53/548; 53/550; 53/373; 156/553; 156/583.1; 493/193; 493/205; 493/206
[58] Field of Search .......... 156/515, 553, 583.1; 53/548, 550, 551, 552, 553, 554, 373; 493/193, 194, 196, 197, 206, 289, 205

[56] References Cited

U.S. PATENT DOCUMENTS

| | | | |
|---|---|---|---|
| 2,944,469 | 7/1960 | Heinzer | 156/583.1 |
| 3,884,129 | 5/1975 | Monohan | 156/515 |
| 3,992,981 | 11/1976 | Stock | 156/515 |
| 4,019,307 | 4/1977 | Ballestazzi et al. | 53/553 |
| 4,063,400 | 12/1977 | Millevoi | 53/548 |
| 4,460,431 | 7/1984 | Keller et al. | 493/205 |
| 4,483,126 | 11/1984 | Henry | 53/554 |

*Primary Examiner*—Michael Wityshyn
*Attorney, Agent, or Firm*—Frishauf, Holtz, Goodman & Woodward

[57] ABSTRACT

For producing transverse seams on tube bag machines, two conjointly, oppositely moving sealing tool jaws (15, 16) are provided, which are movable on a carriage (6) during the sealing process.

For driving the sealing tool and selecting an appropriate stroke length, the frame (5) on which the carriage (6) rests is movable up and down by a pair of coupled cam-actuated levers (19). The axes of rotation (34) of two levers (19), and thus the distances travelled by their uncoupled, flapping ends, are adjustable along the lengths of the levers. This is accomplished by turning a spindle (3) bearing oppositely wound screw threads, which sets adjustment bodies (30) with sliding blocks (4) for the two-armed levers (19).

Thus, packages of varying heights can be efficiently sealed, since the sealing mechanism always seals in the middle of the package height, regardless of stroke length selected.

6 Claims, 2 Drawing Figures

PACKAGING MACHINE WITH SEALING MEANS

The present invention relates generally to machines for making plastic bags or plastic-wrapped packages from continuous plastic tubes, and more particularly to such a machine with an improved mechanism for driving the sealing means through their stroke and for adjusting the length of the stroke.

BACKGROUND

Conventional bagmaking machines of horizontal or vertical construction have a fixed working stroke. The sealing means which produce the transverse seam may either be heat-sealers, for treatment of heat-sealable films, or welders for treatment of thermoplastic films. These conventional sealing stations have hitherto been driven either pneumatically, hydraulically, or mechanically by cams. These drive techniques result in a predetermined, unchangeable stroke, The clearance of the article lying on the conveyor belt is determined by the maximum height of the product to be processed or the maximum depth of the bag to be made.

There is, however, a need to be able to treat both large and small packages on the same machine, depending on the particular weight or bag size desired. This is made more difficult by the requirement that the packages must be provided with a transverse seam during their movement along a conveyor belt.

THE INVENTION

It is an object to provide a packaging machine whose sealing mechanism can be adjusted in the simplest possible way to correspond to a variety of packaging sizes, in such a manner that, regardless of the stroke length chosen, both the sealing means for producing the transverse seams always contact the film at the middle of the package height, and that, simultaneously with the seam formation, they impart to the bag thus formed a displacing motion corresponding to the feed rate of the belt.

Briefly, the packaging machine of the present invention has a pair of coupled, oppositely moving sealing devices driven by at least one two-armed lever with a sliding pivot or fulcrum to adjust the stroke length of lever, and thereby the sealing devices, for a selected product height.

For any given seam sealing or welding time, this permits a significantly higher production capacity and quieter machine operation, as well as reduced movement of mass, less shuddering, and reduced waste.

DRAWINGS

FIG. 1 is a side view of the packaging machine; and
FIG. 2 is an enlarged section along line II—II of FIG. 1.

DETAILED DESCRIPTION

Figure 1:
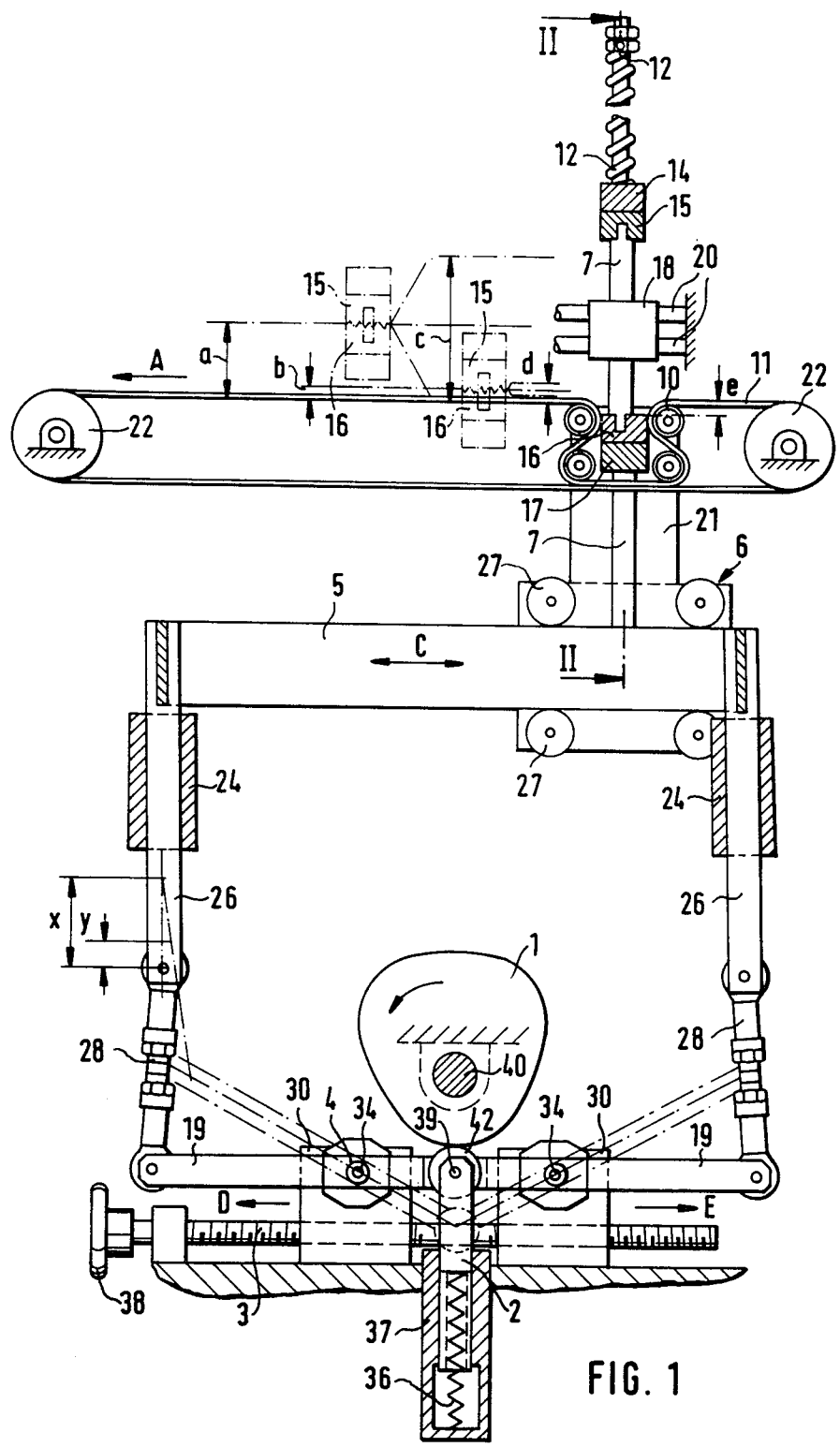

As shown in FIG. 1, a cam 1, synchronously driven by the packaging machine, rotates on a shaft 40 and engages a cam follower 42. This cam follower 42 is coupled to a pushrod 2, which is vertically movable in a guide element 37. A bolt 39, connecting cam follower 42 and pushrod 2, is also connected to left and right levers 19. Each lever 19 is longitudinally slidable in a sliding block 4, each of which is, in turn, rotatably attached to an adjustment body 30. The sliding blocks 4 are fastened in these adjustment bodies 30 by pivots 34, which do not penetrate the levers 19 themselves. The adjustment bodies 30 are adjusted by means of a spindle 3 and a handwheel 38. The spindle 3 has oppositely spiralled screwthreads, so that when the spindle is turned, the adjustment bodies 30 move along the spindle in opposite directions.

Since each of the levers 19 operates as a two-armed lever, a displacement of the adjustment bodies 30, and therewith the sliding blocks 4, in the direction of the arrows D and E has the result that the lever-arm relationships of both levers 19 change.

The end adjustment position of the sliding blocks 4 which produces the largest stroke is illustrated in FIG. 1. At their outer ends, each lever 19 is rotatably fastened to one of a pair of hinged tie bars 28, which are, in turn, hingedly fastened to rods 26, which are slidable in parallel journal boxes 24 on a frame 5.

When cam 1 turns, different strokes of the rods 26, and of a frame 5, are caused, depending upon where the centers of rotation of the levers 19 turn out to be. Thus, if the pivots 34 are most closely spaced, the flapping of the levers 19 will result in a large stroke of size X as shown, while if the pivots 34 are most widely spaced, the flapping of the levers 19 will result in a small stroke of size Y, and intermediate spacing can be chosen to result in any stepped size between those sizes.

The journal boxes 24 act as parallel guides for the frame 5, on which a carriage 6 is supported, reciprocable in the direction of double arrow C. The carriage 6 is moved on rollers 27 along the frame 5, corresponding to the feed motion of the bag to be closed during the sealing process for formation of a seam.

Figure 2:
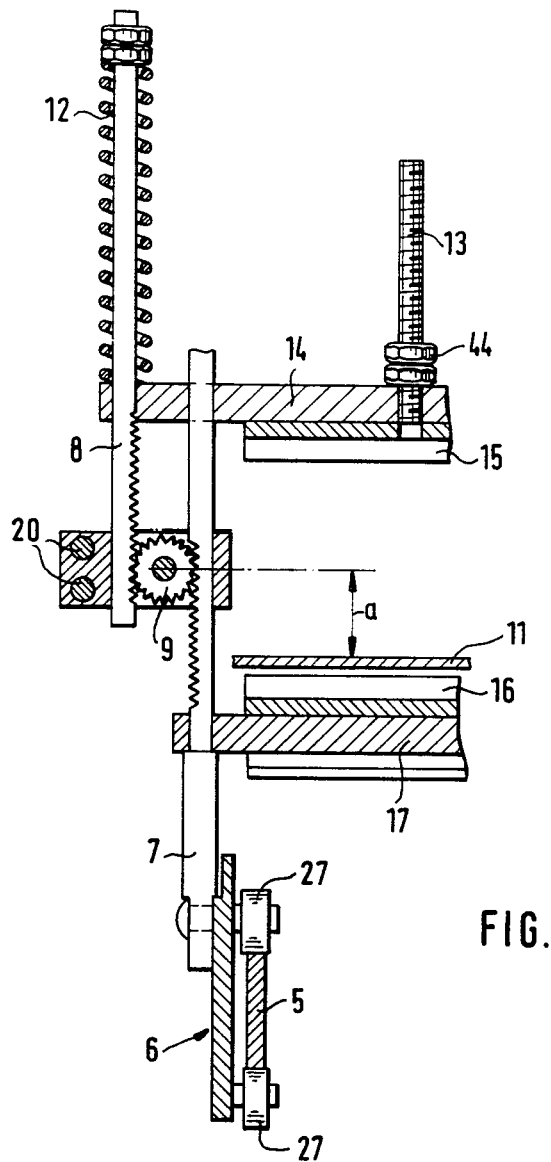

As shown in FIG. 2, the carriage 6 is rigidly connected to a vertical rack 7 which has teeth in its middle region. This rack 7 is rigidly connected to a tool support plate 17, which, in turn, supports a first or lower tool jaw 16. The rack 7 engages a rotatable pinion gear 9 supported in a stationary position, on the diametrically opposite side of which is engaged a further rack 8, which has teeth only on a portion of its length.

The pinion 9 is supported in a carrier 18, which is horizontally movable along two parallel guide rods 20 in concert with the carriage 6. An upper tool support plate 14 is rigidly connected to the rack 8. The plate 14 supports a second or upper tool jaw 15. The vertical position of the upper jaw 15 can be adjusted by means of a threaded rod 13, fastened to the upper jaw and extended upward through the plate 14, and can be fixed by means of adjusting nuts 44 threaded atop the plate 14 on the rod 13. When the rack 7 moves upward, the pinion 9 rotates on its axis and moves the rack 8 an equal distance in the opposite direction.

OPERATION

The bag material to be seamed is fed from the tube-forming machine onto an endless, horizontal conveyor belt 11 driven by deflection rollers 22. In the portion 21 of the machine above the carriage 6, the belt 11 is threaded around four rollers 10 in such a way as to form a niche, in which are disposed the lower tool jaw 16 and the tool support plate 17. After the closing of the package, the bags are transported away on the conveyor belt 11 in the direction of arrow A. During the sealing process, the carriage 6, together with the rollers 10 and the sealing mechanism, moves in the feed direction of the bag material. During this movement, the sealing of the package is accomplished, either by heat-sealing or welding of the tube-shaped package, which comprises either a heat-sealable film or a thermoplastic film.

The tool jaws 15, 16 are adapted to formation of transverse seams and create simultaneously a top seam line, and a separate bottom seam line. Between the seam lines, the tool features a separating knife (not shown), which, upon closing of the tool jaws 15 and 16, cuts the film and separates the bags.

As shown by the bag outlines illustrated by broken lines in FIG. 1, upon a change from a greater product height c to a smaller product height d, the problem arises that the tool jaws 15, 16 carry out a smaller stroke, yet nevertheless must meet and seal at an elevation which is exactly in the middle of the height of the product. This meeting zone is located at a different elevation above the belt 11 depending upon the height of the product; in the case of greater product height c, the middle is at elevation a, while in the case of smaller product height d, the middle is at elevation b. Further, the space for the stroke which the lower tool jaw 16 can carry out is restricted by the depth of the niche formed in the conveyor belt 11.

The adjustment to the middle of the bag which is in position for processing is achieved by changing the effective lengths of the lever arms of levers 19. The starting position for all stroke length settings is the same, since both levers 19 in the starting position, illustrated in FIG. 1, always occupy a co-linear position. For this reason, the distance e between the conveyor belt 11 and the tool jaw 16 located under it is constant and independent of what stroke has been set. The position of the upper tool jaw 15 must be adjusted by resetting of the threaded rod 13 according to the height of the product which is being processed. During the sealing or welding process, the closed sealing means 15, 16 travel with the bag, which is moving on the conveyor belt 11 in the direction of the arrow A, and open at the end of the intended displacement motion. Thereafter, the carriage 6, and with it the sealing means, are moved back into the starting position by, for example, a spring.

As shown in broken lines in FIG. 1, this movement path in the direction of arrow A can be variably large and depends upon the package length.

Instead of a handwheel 38 and adjustment nuts 44 on a threaded rod 13, a motorized or even automatic setting mechanism may be provided, and may, for example, be digitized and easily adjusted to desired bag sizes.

With vertical tube bag machines, this sealing mechanism can also be used, with a rotation of 90°. The conveyor belt 11 is dispensed with in this case and the packages fall directly down by gravity, once they are separated from each other.

Various changes and modifications may be made within the scope of the inventive concept.

I claim:

1. Packaging machine, with coupled, oppositely movable seam-forming first and second sealing means (16, 15), which, during the sealing process, are movable in the feed direction of the bag material,
   wherein, in accordance with the invention,
   the oppositely movable sealing means (15,16) have a drive which comprises two identically formed two-armed levers (19) which are interconnected at one end of each lever, and are each slidably and rotatably supported in a respective pivot (34);
   the pivots (34) are commonly and oppositely adjustable along the lengths of the respective levers for adjustment to different lengths of a sealing stroke of said sealing means (15, 16); and
   outer ends of said levers (19) are connected by connecting arms (28) with a parallel guide frame (5, 24, 26) which transmits movement from said drive to said oppositely movable sealing means (15, 16) and actuates opposite movements of said first and second sealing means (15, 16) with respect to one another.

2. Packaging machine according to claim 1, characterized in that
   an eccentric cam (1) is provided which engages a cam follower (42) located at the connection point of the two levers (19) and which is connected with a spring (36)-loaded movable pushrod (2) and
   both levers (19) occupy a co-linear position in the beginning state.

3. An adjustable machine for sealing tubular plastic film around products of varying heights, having
   means (11) for conveying said product during the sealing process at a feed rate of said plastic film;
   means having first (16) and second (15) jaws for sealing said plastic film;
   means (6) for conjointly reciprocating said sealing means (15,16) from an initial position, along with each product during the sealing process, and back to said initial position;
   comprising, in accordance with the invention,
   means (13,44) connected to said reciprocating means (6) for adjusting the initial position of said second jaw (15) of said sealing means;
   a frame (5) supporting said reciprocating means (6) and reciprocable in a plane orthogonal to the motion of said reciprocating means (6);
   means (7,8,9) mounted on said reciprocating means (6) for translating reciprocation of said frame (5) into opening and closing motions of said sealing means (15,16) for effecting an equal and oppositely directed, with respect to said products to be sealed, stroke of said first and second sealing jaws (16, 15);
   and means (38, 3, 30) connected to said reciprocating means (6) for adjusting the length of the stroke of said sealing means (15,16) relative to each other as a function of the height of said product to locate the meeting zone of said first and second jaws (15,16) at a predetermined position with respect to the product and permit variation of said position as the height of the product changes.

4. The adjustable machine of claim 3, further comprising means for reciprocating said frame (5), namely
   a rotating eccentric cam (1) on a fixed shaft (40);
   a spring-loaded cam follower (42) engaging the cam (1);
   a pair of levers (19), each connected at one end to said cam follower (42);
   a pair of pivots (34) each supporting one of said levers (19) and slidable relative to each other in a plane orthogonal to a line connecting the axes of rotation of said cam (1) and said cam follower (42), such that rotation of said cam (1) causes said levers (19) to flap on said pivots (34);
   a pair of tie bars (28), each rotatably connected to the end of one of said levers (19) remote from said cam follower (42); and
   a pair of parallel rods (26) journalled in said frame (5), each rotatably connected at one end to one of said tie bars (28).

5. The adjustable machine of claim 4, wherein said translating means comprises
   first support means (7) for said first jaw (16), second support means (8) for said second jaw (15), and means (9) connecting said first and second support means for imparting to said second means (8) motion equal and opposite to any motion of said first support means (7).

6. The adjustable machine of claim 5, wherein
said first support means (7) is a rack,
said second support means (8) is a rack, and
said connecting means (9) is a pinion gear engaging on diametrically opposite sides both said racks.

* * * * *